(12) United States Patent
Hayama

(10) Patent No.: US 6,480,887 B1
(45) Date of Patent: Nov. 12, 2002

(54) METHOD OF RETAINING AND MANAGING CURRENTLY DISPLAYED CONTENT INFORMATION IN WEB SERVER

(75) Inventor: Tatsuya Hayama, Komae (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/342,733

(22) Filed: Jun. 29, 1999

(30) Foreign Application Priority Data

Jun. 30, 1998 (JP) .......................................... 10-185122

(51) Int. Cl.[7] .............................................. G06F 15/16
(52) U.S. Cl. ........................ 709/217; 709/203; 709/229
(58) Field of Search ................................ 709/203, 217, 709/229

(56) References Cited

U.S. PATENT DOCUMENTS

| | | | | |
|---|---|---|---|---|
| 5,737,619 A | * | 4/1998 | Judson ........................ | 707/500 |
| 5,958,008 A | * | 9/1999 | Pogrebisky et al. ........ | 709/223 |
| 6,055,522 A | * | 4/2000 | Krishna et al. ............. | 707/517 |
| 6,169,992 B1 | * | 1/2001 | Beall et al. .................. | 345/419 |
| 6,170,014 B1 | * | 1/2001 | Darago et al. .............. | 709/217 |
| 6,189,008 B1 | * | 2/2001 | Easty et al. ................. | 705/14 |
| 6,247,012 B1 | * | 6/2001 | Kitamura et al. ........... | 707/10 |

* cited by examiner

Primary Examiner—Krisna Lim
(74) Attorney, Agent, or Firm—Finnegan, Henderson, Farabow, Garrett & Dunner, L.L.P.

(57) ABSTRACT

In response to a content request issued from a client to a Web server, a registration section in a current content storage section searches a current content storage list by using the client information of the request source as a key. If the client information of the request source is not registered, the registration section registers a set of the client. information and the content name indicated by the request in the current content storage list. If the client information is registered, the registration section performs registration processing to replace the content name combined with the client information in the current content storage list with the content name indicated by the request. A content search section searches the content storage section for the content requested by the content request. This content is returned to the request source after specific header information indicating that the content is not to be cached is added to the content by a header adding section. With this operation, the current display content information on the client can be retained and managed on the Web server side.

13 Claims, 15 Drawing Sheets

METHOD OF RETAINING AND MANAGING CURRENTLY DISPLAYED CONTENT INFORMATION IN WEB SERVER

BACKGROUND OF THE INVENTION

The present invention relates to a Web server for transmitting a content to a client as a content request source in response to a content request from the client and, more particularly, to a method of allowing a server to retain/manage information related to the content currently displayed on a client.

In recent years, the World Wide Web (WWW) system for browsing information through a network, e.g., the Internet, has rapidly become popular. In the WWW, a client can browse contents called pages on a Web server (to be simply referred to as a server hereinafter) by using a content browsing mechanism (software in reality). This system is a so-called client server system in which a content request (generally called a page request) is output from a browser to a server, and the server searches and provides a content corresponding to the request.

In a conventional system, a client performs content browsing according to a procedure in which the client outputs a content request to a server, and the server transmits a content to the client. Every time an HTTP (Hyper Text Transfer Protocol) request is generated between a client and server, connection is made to a network. After the page contents are transmitted/received, disconnection is made. If network connection is always maintained, the load on the server increases. The above operation is therefore a means for preventing such a situation. However, since disconnection is made every time page contents are transmitted/received, connection must be performed independently. For this reason, the server has no means for acquiring information at the previous connection, e.g., information indicating which page has been previously requested.

The conventional system therefore uses a method of sending information at connection from a server to a client, storing it in the client, and reading out the information from the client at the next connection by using a function called "Cookie". In this method, however, information irrelevant to pages are sent to the client, posing problems in terms of security.

A web browser serving as an information browsing mechanism for a client is equipped with various operation buttons, e.g., a Back button (to return an immediately preceding page in a history), Forward button (to move to an immediately succeeding page in a history), and direct page selection button on a history display window. Page information subjected to operation using these buttons is generally stored in a browser cache. With the above button operation, therefore, page information intended by the user is generally extracted from the cache, but no access is made to the server. In this case as well, the server has no means for acquiring which page is currently displayed on the client.

Assume that link buttons are prepared in page information to make the user perform content browsing on the client side in the order intended by the server. In this case, if the user use the above operation buttons, content browsing may be performed in an order different from that intended by the server. This presents a problem in operation that attaches importance on the browsing order, e.g., Internet shopping and access to a database through an intranet.

BRIEF SUMMARY OF THE INVENTION

Accordingly, it is an object of the present invention to provide a current display content information retention/management method in a server capable of retaining/managing the current display content information on a client.

It is another object of the present invention to provide a current display content information retention/management method in a server capable of designating the types of content information to be retained/managed.

It is still another object of the present invention to provide a current display content information retention/management method in a server capable of making a client perform content browsing in the order intended by the server.

It is still another object of the present invention to provide a current display content information retention/management method in a server capable of notifying a client of an operation error made by the client.

It is still another object of the present invention to provide a current display content information retention/management method in a server capable of re-transmitting the current display content information managed/retained by the server to a client, regardless of a request therefrom, when an operation error is made on the client side.

According to one aspect of the present invention, there is provided a method of allowing a Web server which transmits a content to a client as a content request source in accordance with a content request from the client to retain/manage information related to a content currently displayed on the client, comprising the steps of: preparing a current content storage list in which identification information of a latest content transmitted to the client as the content request source is registered in combination with client information indicating the client as the content request source; searching the current content storage list in response to the content request from the client by using the client information indicating the client as the content request source as a key, registering a set of the client information and identification information of a content indicated by the content request in the current content storage list when the client information of the content request source is not registered; and replacing the content identification information combined with the client information in the current content storage list with the content identification information indicated by the corresponding content request when the client information of the content request source is registered, and searching the content requested by the content request and transmitting the content to the client as the content request source.

The above method may further comprise the steps of: preparing a storage file type list in which types of content information to be registered in the current content storage list are registered; and searching the storage file type list with a type of the content information indicated by the content request as a key, and performing registration in the current content storage list only when the type of the content information indicated by the content request is registered in the storage file type list.

The above method may further comprise the steps of preparing a transmission order storage list in which an array indicating a content transmission order is registered, searching the transmission order storage list by using the content identification information indicated by the content request as a key, searching the current content storage list by using the client information of the corresponding content request source as a key when the array including the content identification information is present, and extracting content identification information combined with the client information when the client information of the content request source is registered; and searching the array for content identification information to be transmitted next to the extracted content identification information, searching for a content indicated by the content identification information when the searched content identification information coincides with the content identification information indicated by the content request, and performing registration processing in the current content storage list and the transmission processing.

The above method may further comprise the steps of: preparing a movement inhibition host list in which client information as a page movement inhibition target; setting, in a content transmitted from the Web server to the client as the content request source, a procedure for issuing a specific request from the client to the Web server to request page movement inhibition/permission when a predetermined portion of the content is operated while the content is displayed on the window; when the client issues a request to the Web server, checking whether the request is the specific request; when the request is the specific request, performing a first search to search the movement inhibition host list by using client information of the corresponding request source as a key; registering the client information in the movement inhibition host list when a result of the first search indicates that the client information of the request source is not registered, and the specific request indicates page movement inhibition, and deleting the client information from the movement inhibition host list when the client information of the request source is not registered, and the specific request indicates page movement permission; when the request is not the specific request, performing a second search to search the movement inhibition host list by using the client information of the request source as a key; when a result of the second search indicates that the client information of the request source is registered, returning an error notification to the client as the request source; and when a result of the second search indicates that the client information of the request source is not registered, searching for a content indicated by the request, and performing registration processing in the current content storage list and the transmission processing.

The above method may further comprise the steps of: preparing a movement inhibition host list in which client information as a page movement inhibition target; setting, in a content transmitted from the Web server to the client as the content request source, a procedure for issuing a specific request from the client to the Web server to request page movement inhibition/permission when a predetermined portion of the content is operated while the content is displayed on the window; when the client issues a request to the Web server, checking whether the request is the specific request; when the request is the specific request, performing a first search to search the movement inhibition host list by using client information of the corresponding request source as a key; registering the client information in the movement inhibition host list when a result of the first search indicates that the client information of the request source is not registered, and the specific request indicates page movement inhibition, and deleting the client information from the movement inhibition host list when the client information of the request source is not registered, and the specific request indicates page movement permission; when the request is not the specific request, performing a second search to search the movement inhibition host list by using the client information of the request source as a key; when a result of the second search indicates that the client information of the request source is registered, searching the current content storage list by using the client information of the request source as a key to acquire content identification information combined with the client information, and transmitting a content indicated by the acquired content identification information to the client as the request source in place of the requested content; and when a result of the second search indicates that the client information of the request source is not registered, searching a content indicated by the request and performing registration processing in the current content storage list and the transmission processing.

The above method may further comprise the step of: adding specific header information to a content to be transmitted to the request source, the information indicating that the content is not cached.

According to another aspect of the present invention, there is provided a Web server for transmitting a content to a client as a content request source in accordance with a corresponding content request from the client, comprising: a current content storage list in which identification information of a latest content transmitted to the client as the content request source is registered in combination with client information indicating the client as the content request source; registration means for searching the current content storage list in response to the content request from the client by using the client information indicating the client as the content request source as a key, registering a set of the client information and identification information of a content indicated by the content request in the current content storage list when the client information of the content request source is not registered; and replacing the content identification information combined with the client information in the current content storage list with the content identification information indicated by the corresponding content request when the client information of the content request source is registered, and means for searching the content requested by the content request and transmitting the content to the client as the content request source.

The Web server may further comprise a storage file type list in which types of content information to be registered in the current content storage list are registered.

The above Web server may further comprise a transmission order storage list in which an array indicating a content transmission order is registered.

The above Web server may further comprise a movement inhibition host list in which client information as a page movement inhibition target is registered.

The Web server may further comprise means for returning an error notification to the client as the request source when the client information of the request source is registered in the movement inhibition host list.

The Web server may further comprise means for, when the client information of the request source is registered in the movement inhibition host list, returning the same content as that currently displayed on the client as the request source to the client as the request source by searching the current content storage list.

In the Web server, specific header information indicting that a content is not cached may be added to the content to be transmitted to the request source.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

Embodiments of the present will be described below with reference to the views of the accompanying drawing.

First Embodiment

Figure 1:
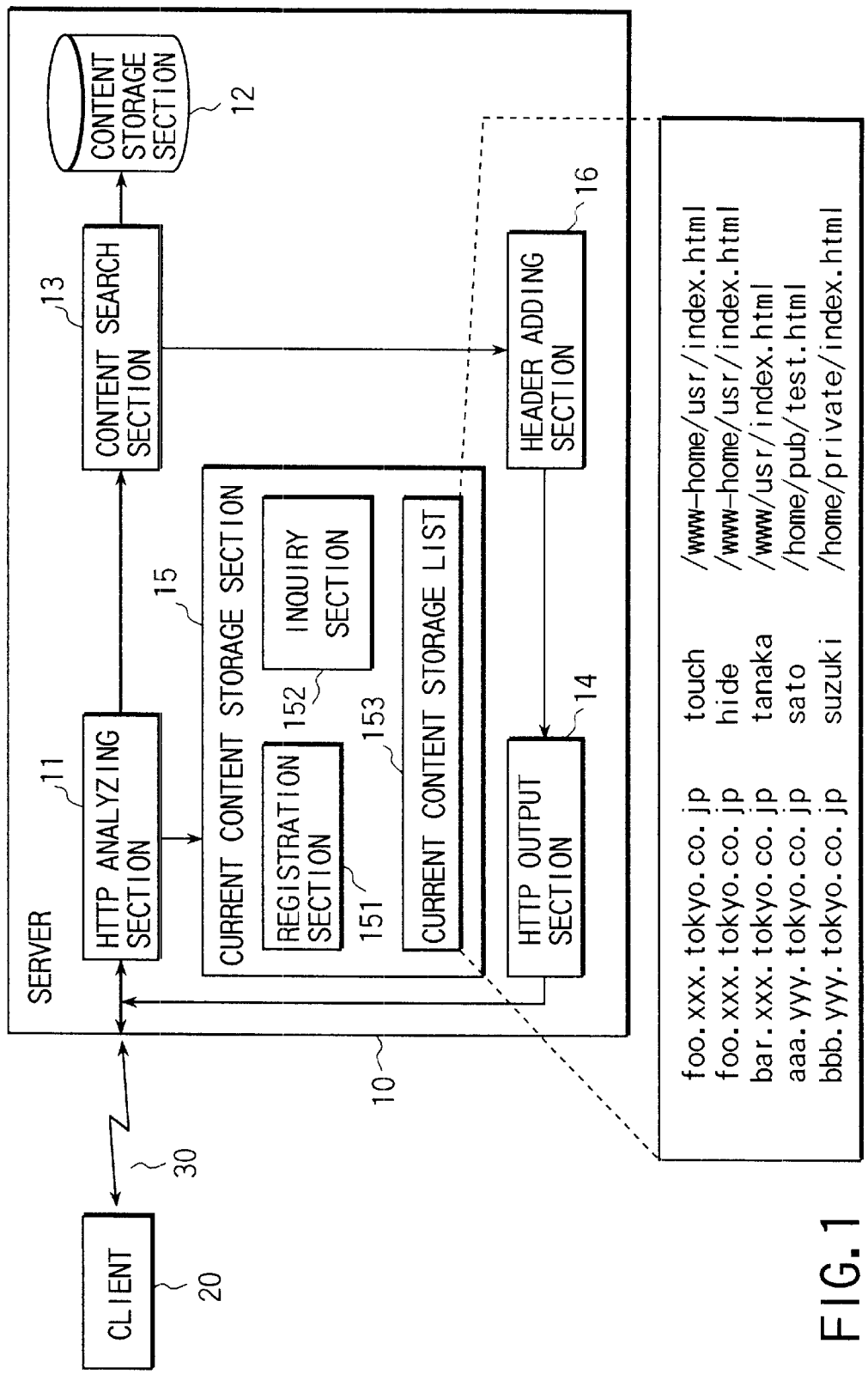
FIG. 1 is a block diagram showing the arrangement of a client server system having a Web server as a main component according to the first embodiment of the present invention.

FIG. 1 is a block diagram showing the arrangement of a client server system having a Web server as a main component according to the first embodiment of the present invention.

Referring to FIG. 1, a Web server (to be simply referred to as a server hereinafter) 10 functions as a WWW (World Wide Web) server for providing information and is connected to a network 30 such as the Internet. A client 20 has a browser (software for browsing information) for issuing a request to the server 10 to browse information and displaying sent information. As this browser, a general-purpose browser such as Netscape Communicator available from Netscape or Internet Explore available from Microsoft may be used.

For convenience in drawing, FIG. 1 shows only one client 20 connected to the network 30. In general, however, a plurality of clients 20 are connected to the network 30. In addition, as is obvious, the number of servers 10 is not limited to one.

In the server 10, an HTTP analyzing section 11 receives a content request (page request) from the client 20, and analyzes the request character string in the request. This request character string includes a character string (to be referred to as a content name hereinafter) generally called a URL (Uniform Resource Locator) indicating a target content, i.e., a request content (location). The contents to be provided by the server 10 are stored in a content storage section 12 constituted by a disk unit and the like.

A content search section 13 searches the content storage section 12 for the request content itself analyzed by the HTTP analyzing section 11. If the content can be properly searched, the content search section 13 sends the content to an HTTP output section 14, together with a value indicating the proper search of the content (through a header adding section 16). If the request content is not present, the content search section 13 sends a value indicating an error to the HTTP output section 14 (through the header adding section 16).

The HTTP output section 14 transmits a search result character string to the client 20 as a request source upon adding header information complying with the HTTP protocol to the character string in accordance with the value received from the content search section 13 (through the header adding section 16).

The above description is about the known arrangement of the server 10. This embodiment is characterized in that a current content storage section 15 and the header adding section 16 are added to this arrangement.

The current content storage section 15 includes a registration section 151 and an inquiry section 152. A current content storage list 153 like the one shown in FIG. 1 is retained in the current content storage section 15. In the list shown in FIG. 1, the first item represents "client host name"; the second item, "client user name"; and the third item, "content name" of a current content (or request content). One line corresponds to one record.

Figure 2:
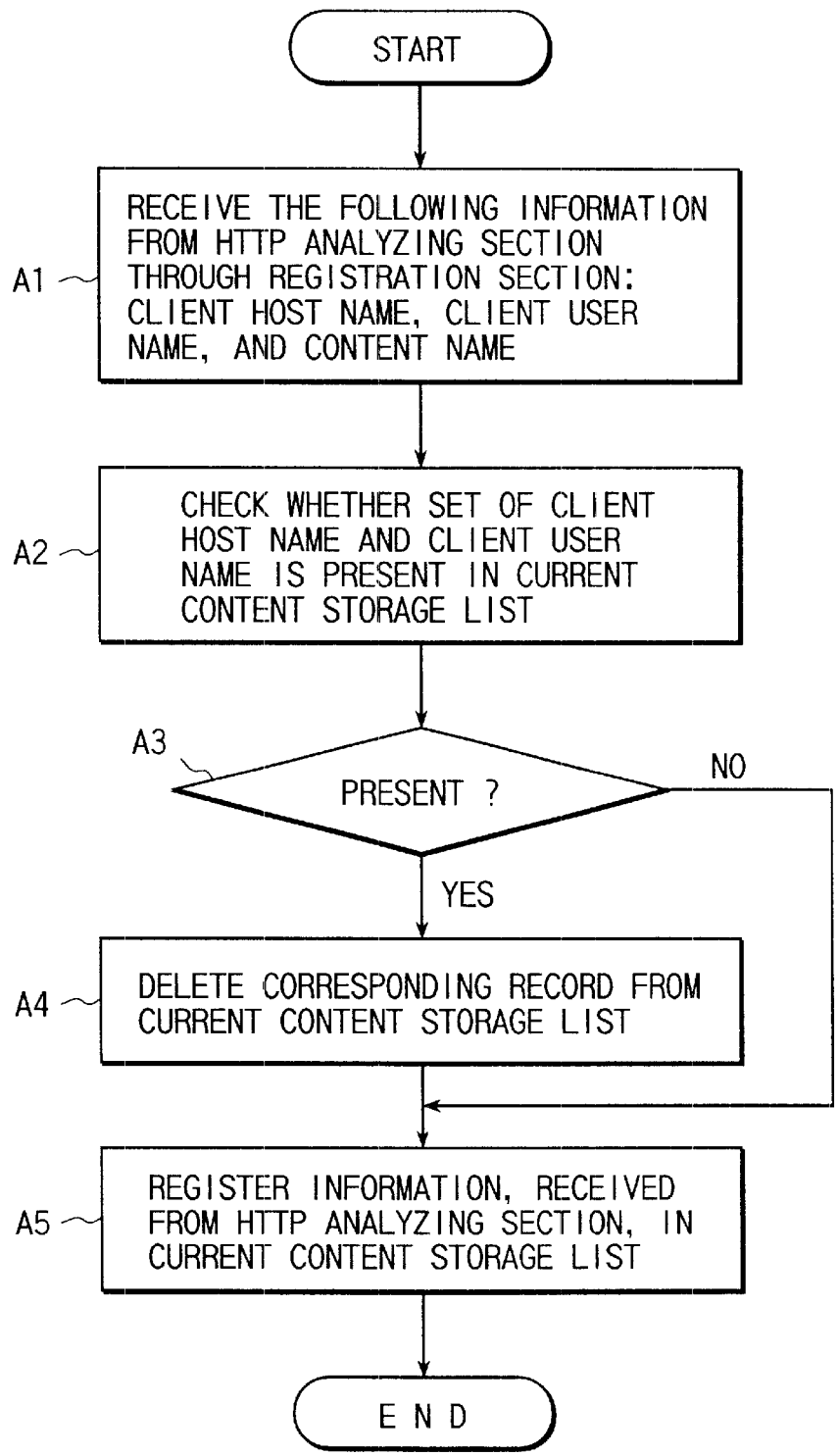
FIG. 2 is a flow chart for explaining the operation of a registration section in a current content storage section in the Web server in FIG. 1.

The operation of the registration section 151 in the current content storage section 15 will be described below with reference to the flow chart of FIG. 2.

Upon reception of a content request from the client 20, the HTTP analyzing section 11 analyzes the request character string in the request, and transfers the analysis result (content request analysis result) to the content search section 13 and the current content storage section 15.

With this operation, the registration section 151 in the current content storage section 15 receives the content request analysis result (request character string analysis result) from the HTTP analyzing section 11, i.e., a set of "client host name", "client user name", and "content name" (indicating the request content from the client 20) (step A1).

For example, "client user name" can be acquired by using a page for requesting a set of a user name and password or the SSL (Secure Sockets Layer) protocol. In addition, since the same user may start a plurality of browsers on the same host, connection IDs may be allocated on the server side to discriminate the browsers and may be retained in the current content storage section 15.

The registration section 151 then checks whether the set of "client host name" and "client user name" (to be sometimes referred to as client information) in the analysis result received from the HTTP analyzing section 11 is present in the current content storage list 153 (step A2).

If this set of information is present (YES in step A3), the registration section 151 deletes the corresponding record from the current content storage list 153 to register new "content name" (step A4), and additionally registers the set of "client host name", "client user name", and "content name", received from the HTTP analyzing section 11, in the current content storage list 153 (step A5).

In contrast to this, if the set of information is not present (NO in step A3), the registration section 151 registers one record consisting of the set of "client host name", "client user name", and "content name" in the current content storage list 153 (step A5).

If the set of "client host name" and "client user name" is present in the current content storage list 153, "content name" in the corresponding record may be replaced with "content name" in the analysis result received from HTTP analyzing section 11. In this case, record deletion processing need not be performed.

Obviously, "content name" of each recorded registered in the current content storage list 153 indicates the content currently displayed (or displayed most lately) in the client (browser) indicated by the set of "client host name" and "client user name" combined with "content name".

Figure 3:
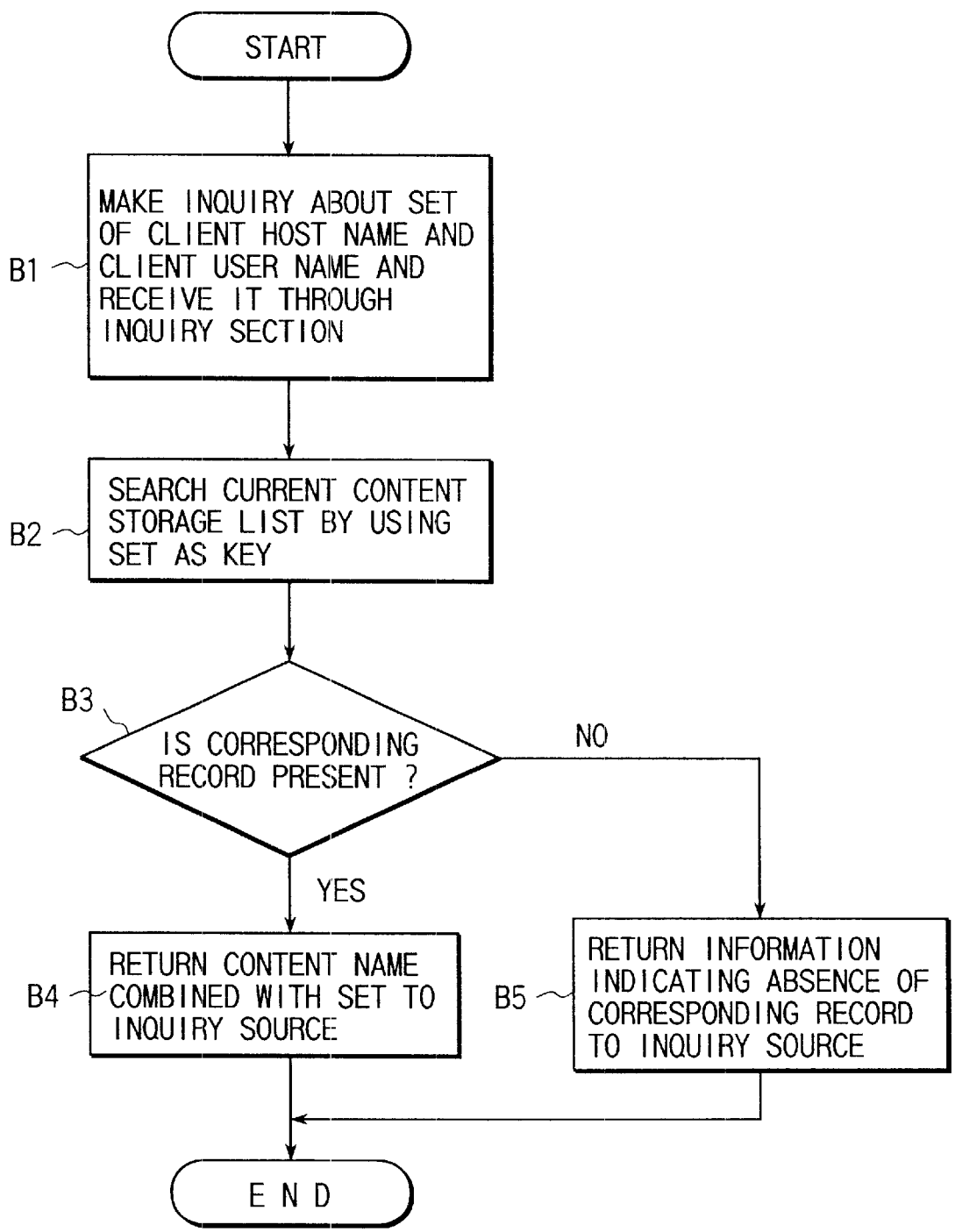
FIG. 3 is a flow chart for explaining the operation of an inquiry section in the current content storage section in the Web server in FIG. 1.

The operation of the inquiry section 152 in the current content storage section 15 will be described next with reference to the flow chart of FIG. 3.

The inquiry section 152 is started to check the content currently displayed (displayed most lately) on a given client (browser). An inquiry source for the inquiry section 152 is a content determining section 51 in the embodiment described later, a content determining section 71 in FIG. 15, or the like, which is not directly associated with this embodiment.

When an inquiry source for the inquiry section 152 needs to acquire the content currently displayed (displayed most lately) on the client (browser) indicated by a given set of "client host name" and "client user name", the inquiry source transfers the set of "client host name" and "client user name" to the current content storage section 15 to make an inquiry about "content name".

The inquiry section 152 in the current content storage section 15 receives the set of "client host name" and "client user name" from the inquiry source (step B1), and searches the current content storage list 153 with this set of information as a key (step B2).

If there is a record corresponding to the search result (YES in step B3), the inquiry section 152 returns "content name" combined with the set of "client host name" and "client user name" in the record to the inquiry source (step B4).

If there is no corresponding record (NO in step B3), the inquiry section 152 returns a value (NULL in this case) indicating the corresponding information to the inquiry source (step B5).

With this operation, the inquiry source can easily acquire the content name (location) of the content currently displayed (or displayed most lately) on the target client (browser).

Referring to FIG. 1 again, the header adding section 16 adds specific header information (e.g., Pragma: no-cache) indicating that the content is regarded as a content not to be cached to the request content searched from the content storage section 12 by the content search section 13, and transfers the resultant content to the HTTP output section 14.

Upon reception of the content (character string) to which the specific header information is added and transferred from the header adding section 16, the HTTP output section 14 transmits the content to the client 20 upon adding header information complying with the HTTP protocol to the content. In the client 20, the content transmitted from the server 10 (HTTP output section 14) is not cached because of the specific header information (Pragma: no-cache) added to the content. That is, with the specific header information added to the header, even when the Back button or Forward button is used on the browser of the client 20, a request is always generated to the server 10.

As described above, in this embodiment, with the addition of the current content storage section 15 and the header adding section 16, the content name (location) of the content currently displayed (displayed most lately) on the client 20 can be easily acquired on the server 10 side.

Second Embodiment

Figure 4:
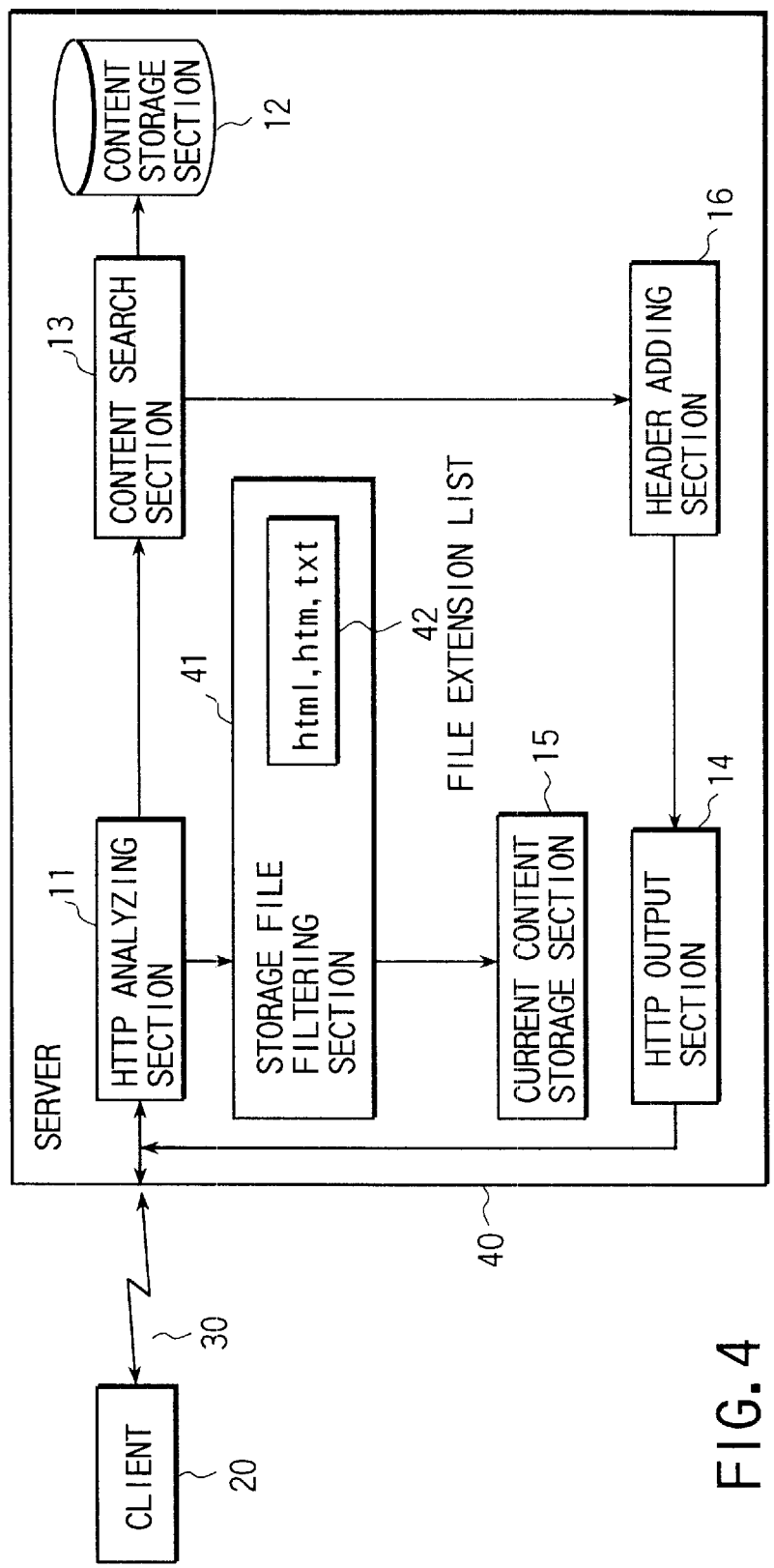
FIG. 4 is a block diagram showing the arrangement of a client server system having a Web server as a main component according to the second embodiment of the present invention.

FIG. 4 is a block diagram showing the arrangement of a client server system having a Web server as a main component according to the second embodiment of the present invention. The same reference numerals in FIG. 4 denote the same parts as in FIG. 1, and a detailed description thereof will be omitted.

A server 40 in FIG. 4 differs from the server 10 in FIG. 1 in that a storage file filtering section 41 is added.

The storage file filtering section 41 holds a storage file type list in which the types of contents to be registered in a current content storage list 153 (see FIG. 1) in a current content storage section 15, e.g., a list (file extension list) 42 of the extensions of content files. In the arrangement shown in FIG. 4, three types of file extensions, namely html, htm, and txt, are registered in the file extension list 42.

Figure 5:
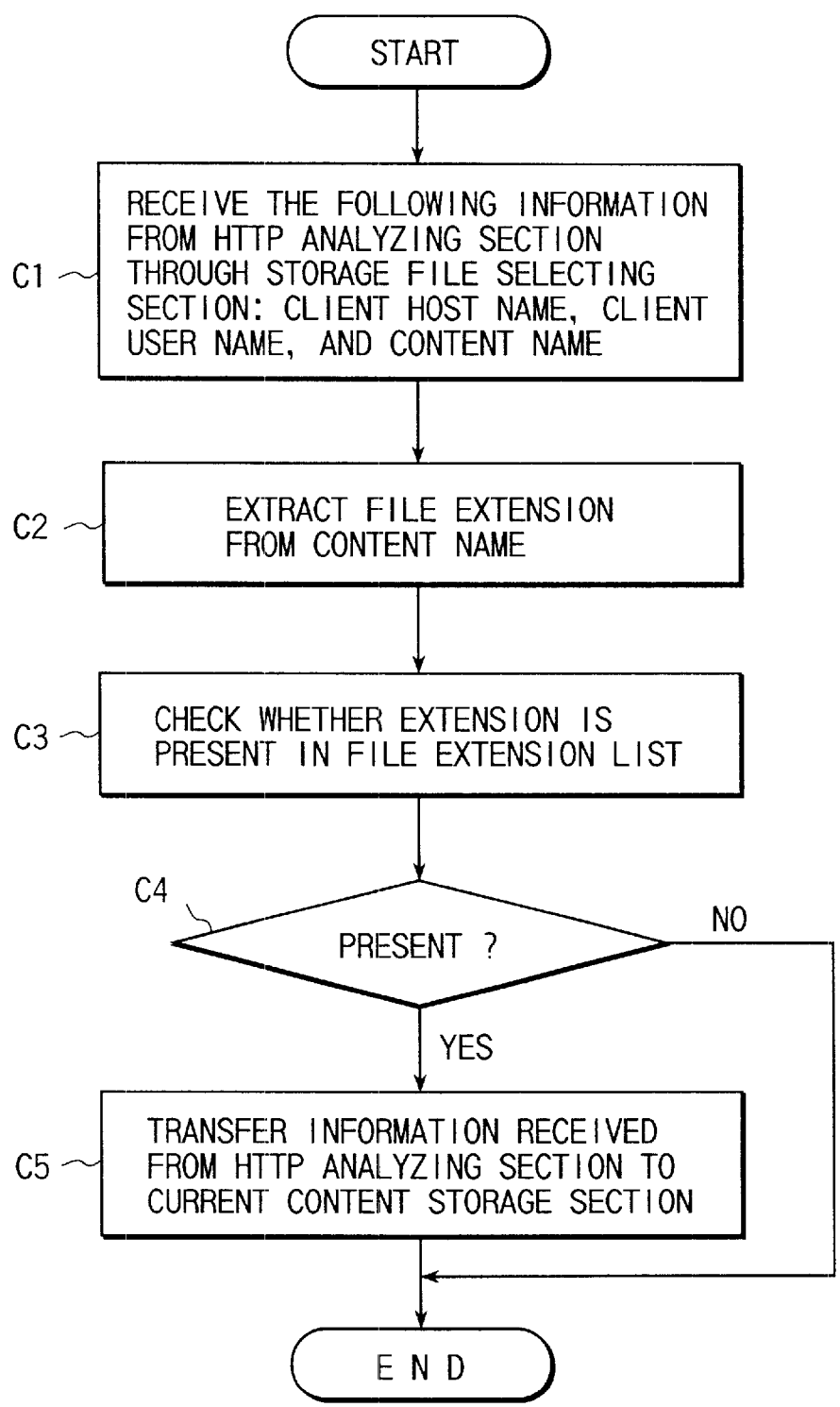
FIG. 5 is a flow chart for explaining the operation of a storage file filtering section in the Web server in FIG. 4.

The operation of the storage file filtering section 41 in the server 40 in the arrangement shown in FIG. 4 will be mainly described with reference to the flow chart of FIG. 5.

Upon reception of a content request from a client 20, an HTTP analyzing section 11 analyzes the request character string in the request and transfers the analysis result to the content search section 13, as in the prior art, and also transfers it to the storage file filtering section 41.

With this operation, the storage file filtering section 41 receives the content request analysis result (request character string analysis result) obtained by the HTTP analyzing section 11, e.g., a set of "content name", "client host name", and "client user name" which indicates the request content from the client 20 (step C1).

The storage file filtering section 41 then extracts a file extension from "content name" (step C2), and checks whether the file extension is present in the file extension list 42 (step C3).

If the file extension is present (YES in step C4), the storage file filtering section 41 calls the current content storage section 15 and transfers the set of "client host name", "client user name", and "content name" received from the HTTP analyzing section 11 to the current content storage section 15 (step C5).

In this case, as in the first embodiment, if a record having this set of "client host name" and "client user name" is present in the current content storage list 153, "content name" in the record is equivalently updated with currently received "content name". If such a record is not present, the record consisting of the currently received set of "client host name", "client user name", and "content name" is added.

In contrast to this, if the file extension is not present (NO in step C4), the storage file filtering section 41 does not call the current content storage section 15. That is, no current content is registered in the current content storage list 153 in the current content storage section 15.

As described above, in this embodiment, only when the storage file filtering section 41 added between the HTTP analyzing section 11 and the current content storage section 15 detects the generation of a request for a content of "content name" having an extension registered in the file extension list 42, the set of "client host name", "client user name", and "content name" which is received from the HTTP analyzing section 11 is transferred to the current content storage section 15 to be registered in the current content storage list 153. That is, a file (content) to be retained in the current content storage section 15 (the current content storage list 153) can be selected.

Note that information to be registered in the storage file filtering section 41 (list 42) is not limited to file extensions. For example, content types (Content-Type headers) such as text/html and text/plain may be registered by using information from the content search section 13.

Third Embodiment

Figure 6:
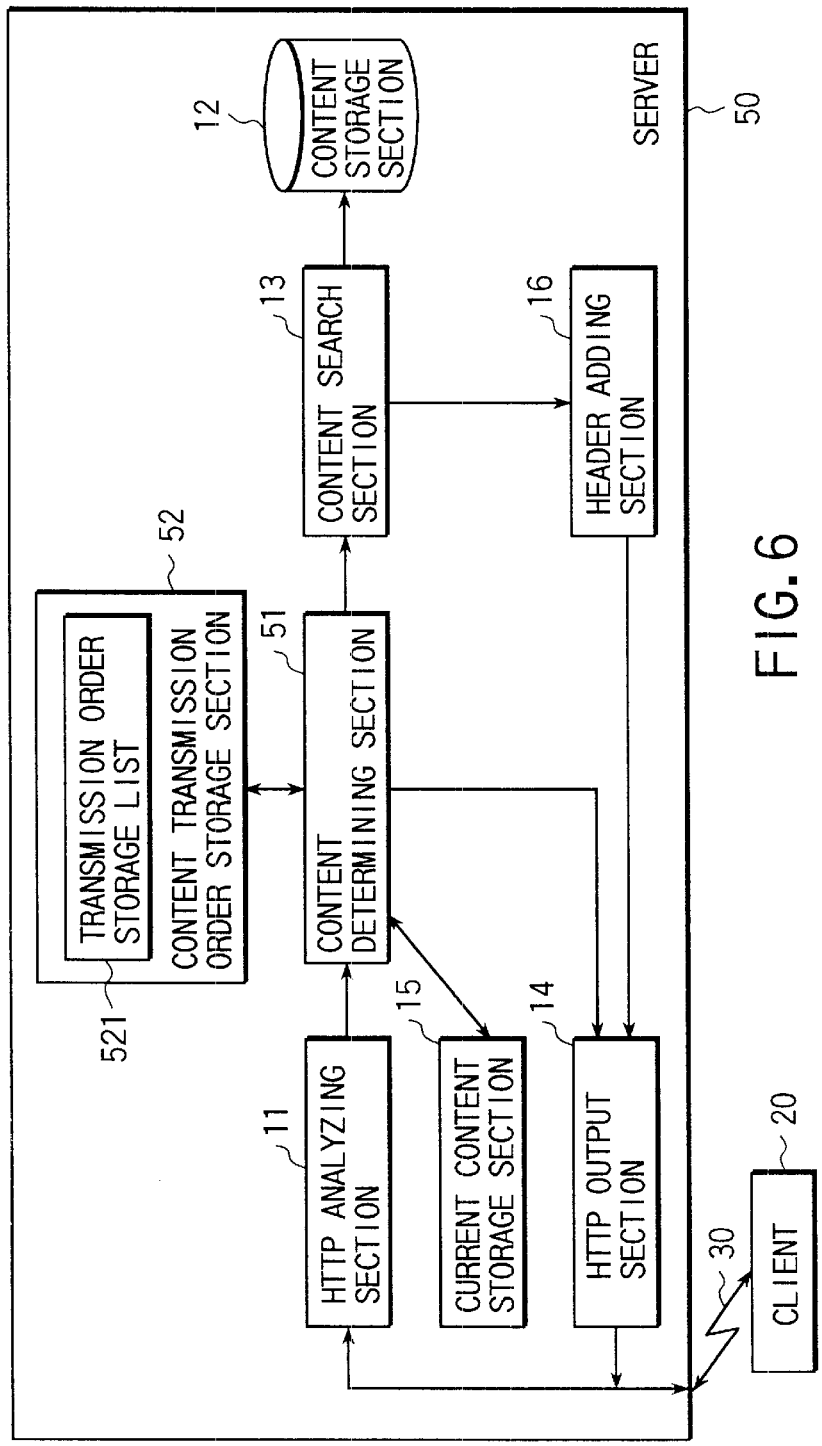
FIG. 6 is a block diagram showing the arrangement of a client server system having a Web server as a main component according to the third embodiment of the present invention.

FIG. 6 is a block diagram showing the arrangement of a client server system having a Web server as a main component according to the third embodiment of the present invention. Note that the same reference numerals in FIG. 6 denote the same parts as in FIG. 1, and a detailed description thereof will be omitted.

A server 50 in FIG. 6 differs from the server 10 in FIG. 1 in that a content determining section 51 and a content transmission order storage section 52 are added. Note that the content determining section 51 and the content transmission order storage section 52 may be added to the server 40 in FIG. 4.

Figure 7:
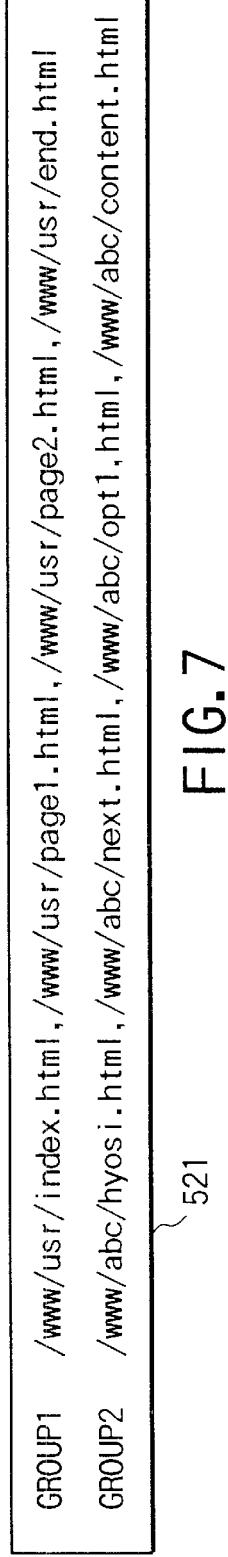
FIG. 7 is a view showing the details of a transmission order storage list in FIG. 6.

The content transmission order storage section 52 holds a transmission order storage list 521 as a list of contents indicating the transmission order. FIG. 7 shows the transmission order storage list 521 in detail. Referring to FIG. 7, the transmission order storage list 521 consists of records (one line corresponding to one record) arranged in units of groups. In one record, the first item represents a tag character string representing a group and the second item represents an array of contents ("content names") to be sent in the designated order. The second item indicates that the contents must be transmitted in the array order of "content names" in the content list in the second item. Note that the tag character string in the first item is not necessarily required.

Figure 8A:
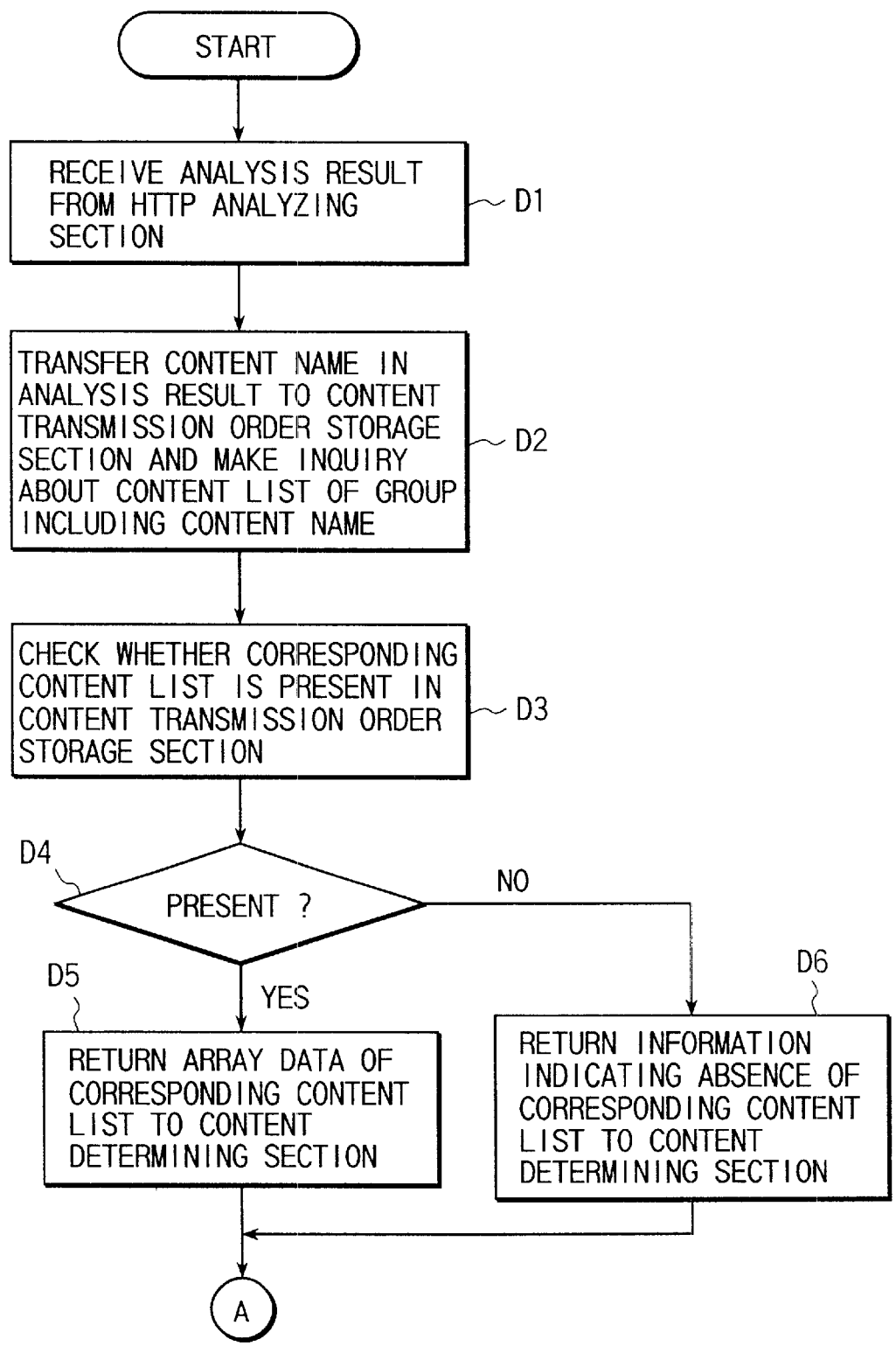
FIGS. 8A, 8B and 8C are flow charts for explaining the operations of a content determining section and content transmission order storage section in the Web server in FIG. 6.
Figure 8B:
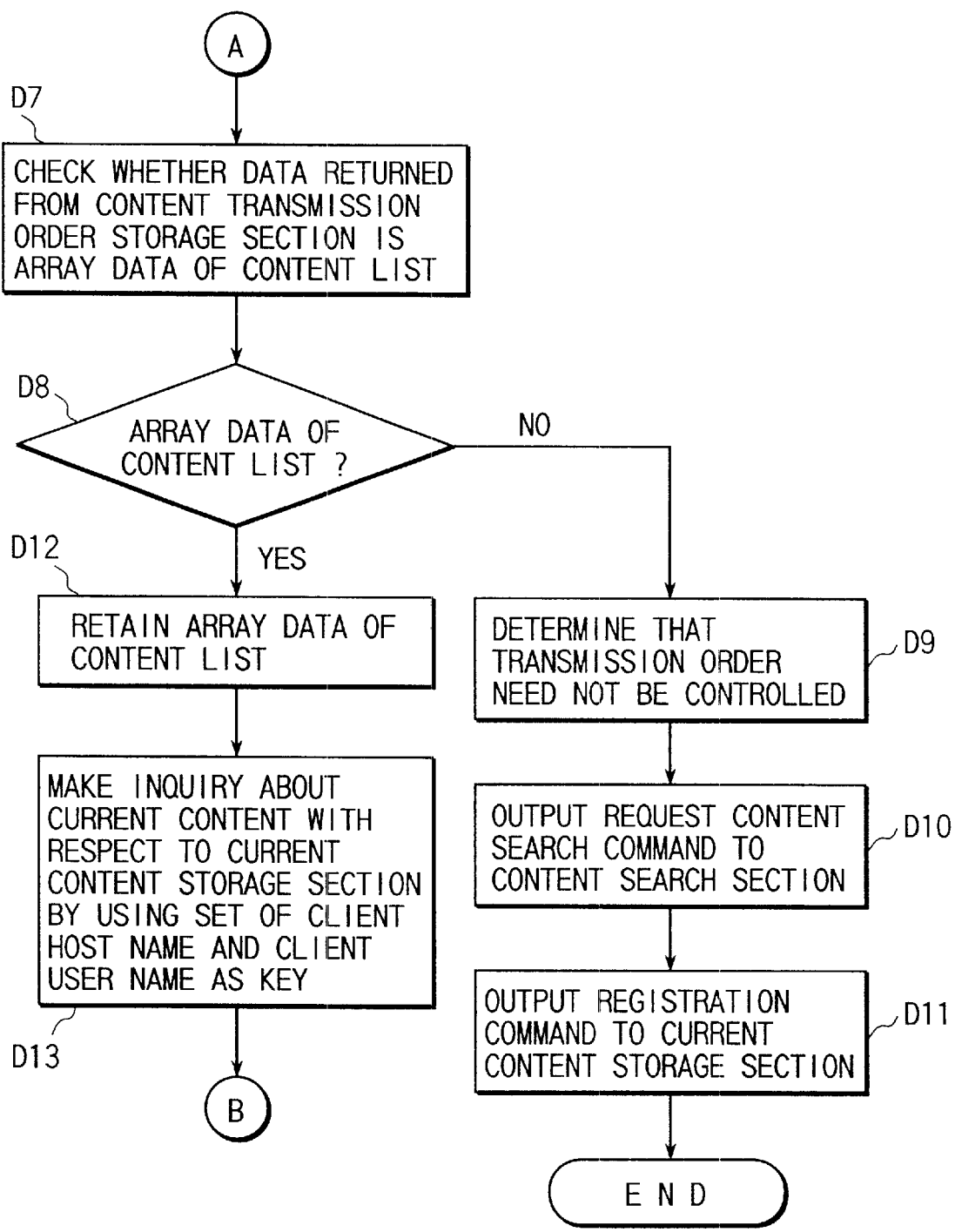
Figure 8C:
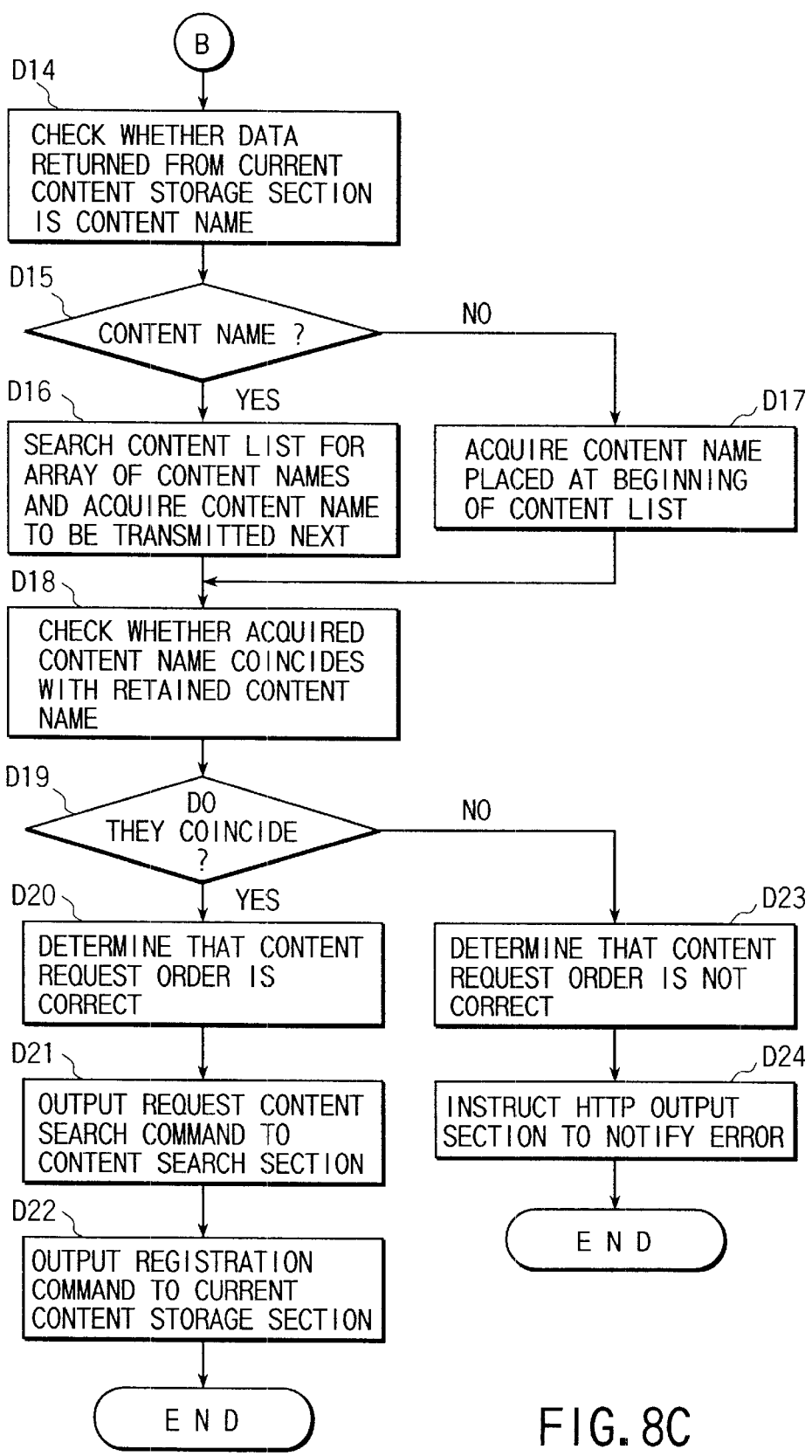

The operations of the content determining section 51 and the content transmission order storage section 52 in the server 50 will be mainly described next with reference to the flow charts of FIGS. 8A to 8C.

Upon reception of a content request from a client 20, an HTTP analyzing section 11 analyzes the request character string in the request, and transfers the analysis result (content request analysis result) to the content determining section 51.

Upon reception of the content request analysis result from the HTTP analyzing section 11 (step D1), the content determining section 51 transfers "content name" in the analysis result to the content transmission order storage section 52, and makes an inquiry about a content list of a group including this "content name" (step D2).

The content transmission order storage section 52 then receives "content name" transferred from the content determining section 51, searches the transmission order storage list 521 with "content name", and checks whether a content list including "content name" is present (step D3).

If the content list is present (YES in step D4), the content transmission order storage section 52 extracts, from the transmission order storage list 521, the content list of the corresponding group, i.e., the array data of the content list of the group including "content name" transferred from the content determining section 51, and returns the array as a return value to the content determining section 51 (step D5).

If such a list is not present (NO in step D4), the content transmission order storage section 52 returns a value (NULL in this case) representing the corresponding information to the content determining section 51 (step D6).

Upon reception of the return value for the inquiry to the content transmission order storage section 52, the content determining section 51 checks whether the return value represents the array data of the content list (whether the return value is NULL or not) (step D7).

If the return value does not represent the array data of the content list (if the return value is NULL) (NO in step D8), the content determining section 51 determines that inquired "content name" is not registered in the transmission order storage list 521, and no control is required on the transmission order (step D9). The content determining section 51 then transfers the content request analysis result obtained by the HTTP analyzing section 11 to a content search section 13 and supplies a request content search command (step D10). At the same time, the content determining section 51 transfers the content request analysis result to a current content storage section 15, and registers a set of "content name" of the content to be transmitted, "client host name", and "client user name" in a current content storage list 153 in the current content storage section 15 (step D11).

If the return value represents the array data of the content list (YES in step D8), i.e., "content name" of the request content is present in the transmission order storage list 521, the content determining section 51 retains the corresponding return value (the array data of the content list) (step D12), and inquires of the current content storage section 15 about the current content by using the set of "client host name" and "client user name" in the analysis result received from the HTTP analyzing section 11 as a key (step D13).

As a consequence, the inquiry section 152 (see FIG. 1) in the current content storage section 15 searches the current content storage list 153 and returns a return value as the search result to the content determining section 51 as an inquiry source. This return value is NULL when "content name" combined with the client information transferred from the content determining section 51 is not present. When such "content name" is present, the return value represents "content name".

The content determining section 51 checks the return value (response to the inquiry) from the current content storage section 15 (step D14). If this return value is not NULL but "content name" (YES in step D15), the content determining section 51 searches, for the array of "content names", the content list returned from the content transmission order storage section 52 with "content name" in the content currently displayed on the client as the content request source, and acquires "content name" of the content to be transmitted next to "content name" of the currently displayed content from the array data (step D16).

If the return value from the current content storage section 15 includes no "content name" (the return value is NULL) (NO in step D15), "content name" placed at the beginning of the content list of the corresponding group is acquired (step D17).

The content determining section 51 then checks whether acquired "content name" (i.e., "content name" of the content to be transmitted next to the currently displayed content) coincides with retained "content name" (i.e., "content name" of the request content) (step D18).

If they coincide with each other (YES in step D19), the content determining section 51 determines that the content request order is correct (step D20). The content determining section 51 then transfers the content request analysis result obtained by the HTTP analyzing section 11 to the content search section 13 and supplies a request content search command thereto (step D21). At the same time, the content determining section 51 transfers the content request analysis result to the current content storage section 15 to register a set of "content name" of the content to be transmitted, "client host name", and "client user name" in the current content storage list 153 (see FIG. 1) in the current content storage section 15 (step D22). In the case of the transmission order storage list 521 in FIGS. 6, this case corresponds to a case in which when the inquiry result (the content currently displayed on the client as the content request source) is index.html, the request content is page1.html.

In contrast to this, if "content name" of the content to be transmitted next to the currently displayed content does not coincide with "content name" of the request content (NO in step D19), the content determining section 51 determines that the content request order from the client is not correct, i.e., operation is not performed in the order designated by the server 50 (step D23), and instructs the HTTP output section 14 to notify an error (step D24). Unlike the above case, this case corresponds to a case in which when the inquiry result is index.html, the request content is not page1.html.

As described above, according to this embodiment, with the addition of the content determining section 51 and the content transmission order storage section 52 to the server 10 (or the server 40 in FIG. 4), when a content request is generated in an order different from that intended by the server, an error notification is returned, thereby allowing transmission of a request content to the client only when a content request is generated in the order intended by the server.

Fourth Embodiment

Figure 9:
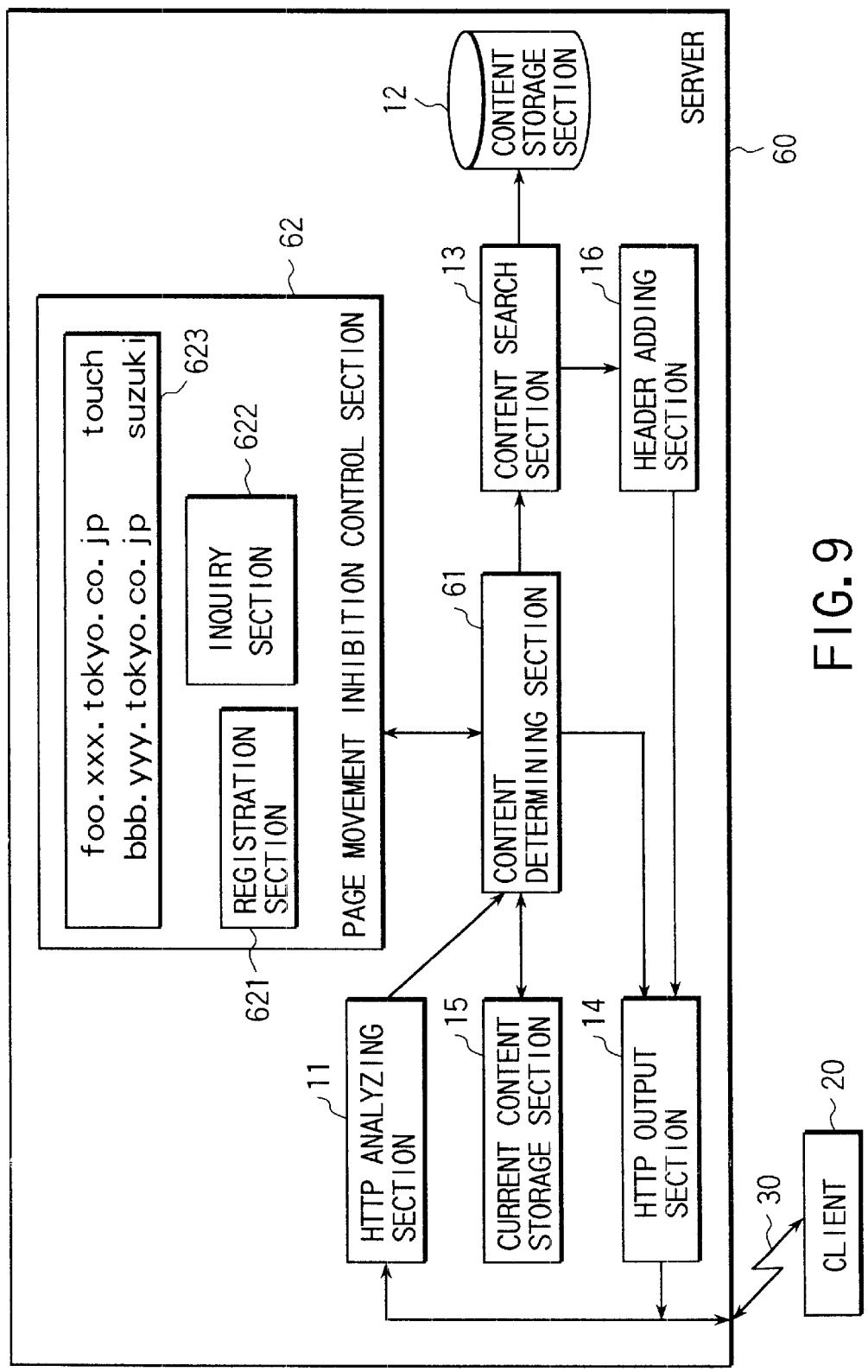
FIG. 9 is a block diagram showing the arrangement of a client server system having a Web server as a main component according to the fourth embodiment of the present invention.

FIG. 9 is a block diagram showing the arrangement of a client server system having a Web server as a main component according to the fourth embodiment of the present invention. Note that the reference numerals in FIG. 9 denote the same parts as in FIG. 6, and a detailed description thereof will be omitted.

A server 60 in FIG. 9 differs from the server 50 in FIG. 6 in that a page movement inhibition control section 62 is used in place of the content transmission order storage section 52, and a content determining section 61 is used in placed of the content determining section 51 in accordance with the page movement inhibition control section 62.

The page movement inhibition control section 62 includes a registration section 621 and an inquiry section 622. A movement inhibition host list 623 like the one shown in FIG. 9. In the list shown in FIG. 9, the first item represents "client host name"; and the second item, "client user name". In this case, the clients (browsers) using the sets of "client host names" and "client user names" registered in the movement inhibition host list 623 are set in the page movement inhibition state.

Figure 10A:
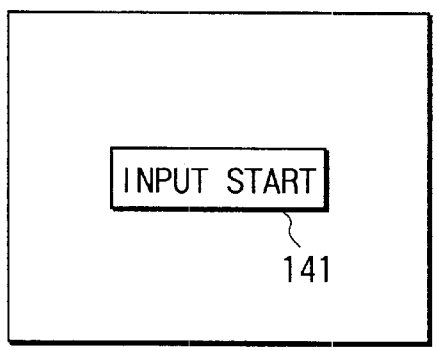
FIGS. 10A and 10B are views showing examples of page windows having operation buttons with which specific requests associated with the settings of page movement inhibition/permission can be issued.
Figure 10B:
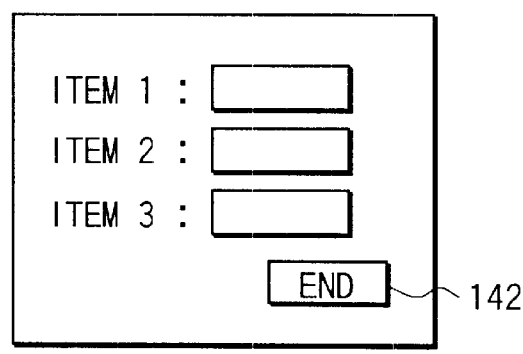

Assume that the page windows (input interface windows) shown in FIGS. 10A and 10B are displayed on the client 20 side (browser). Assume that after a input start button 141 is clicked on the window in FIG. 10A, movement to another page by clicking the Back or Forward button of the browser is to be inhibited until an end button 142 is clicked on the window in FIG. 10A.

On this page window, to transmit the following request:

POST /PageManager?control=on HTTP/1.0 when the input start button 141 is clicked, a procedure for the corresponding content information is written in associated with the input start button 141. This request is called a POST method.

Likewise, to transmit the following request:

POST /PageManager?control=off HTTP/1.0 when the end button 142 is clicked, a procedure for the corresponding content information is written in associated with the end button 142. This request is called a POST method.

For such procedures, Java (Applet) available from Sun Microsystems, JavaScript available from Netscape Communications, or the like can be used.

Figure 11A:
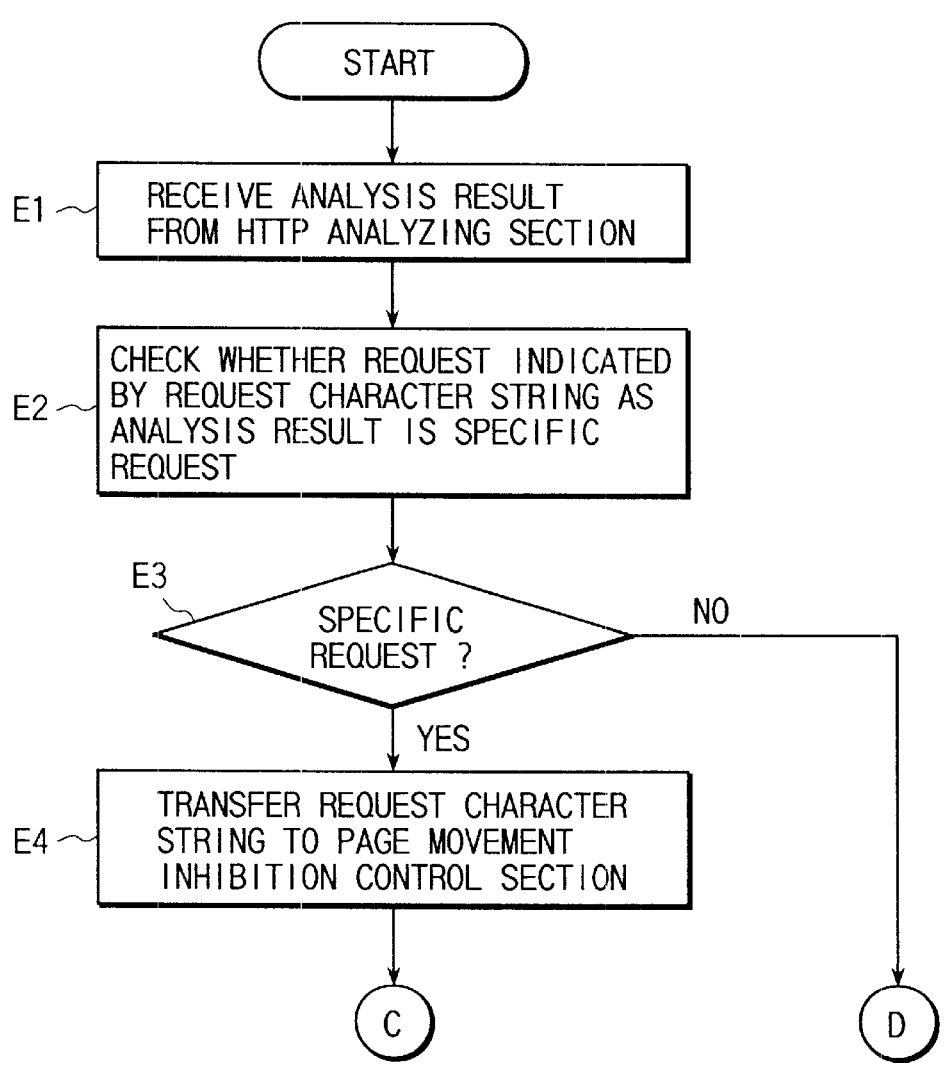
FIGS. 11A, 11B and 11C are flow charts for explaining the operations of a content determining section and page movement inhibition control section in the Web server in FIG. 9.
Figure 11B:
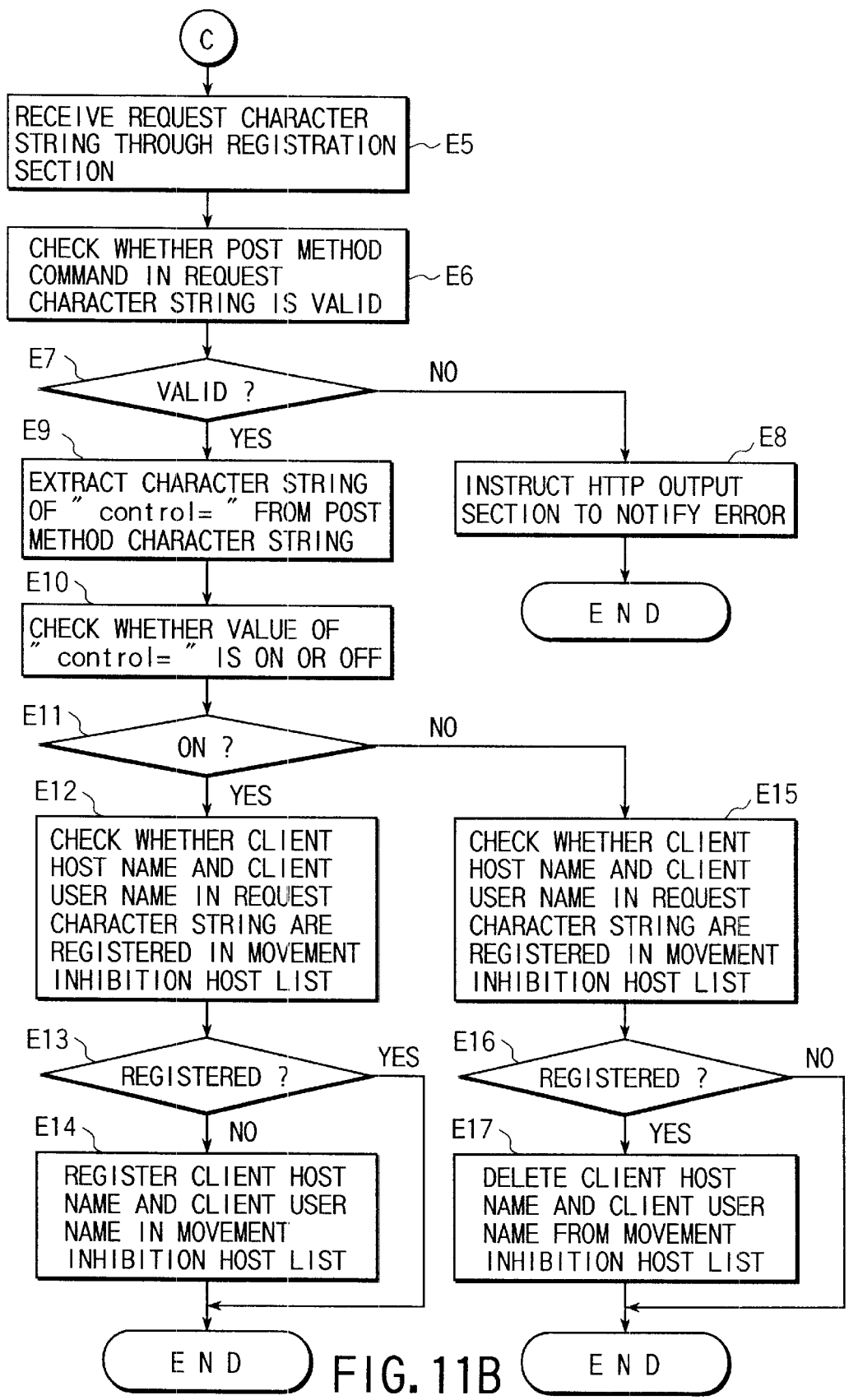
Figure 11C:
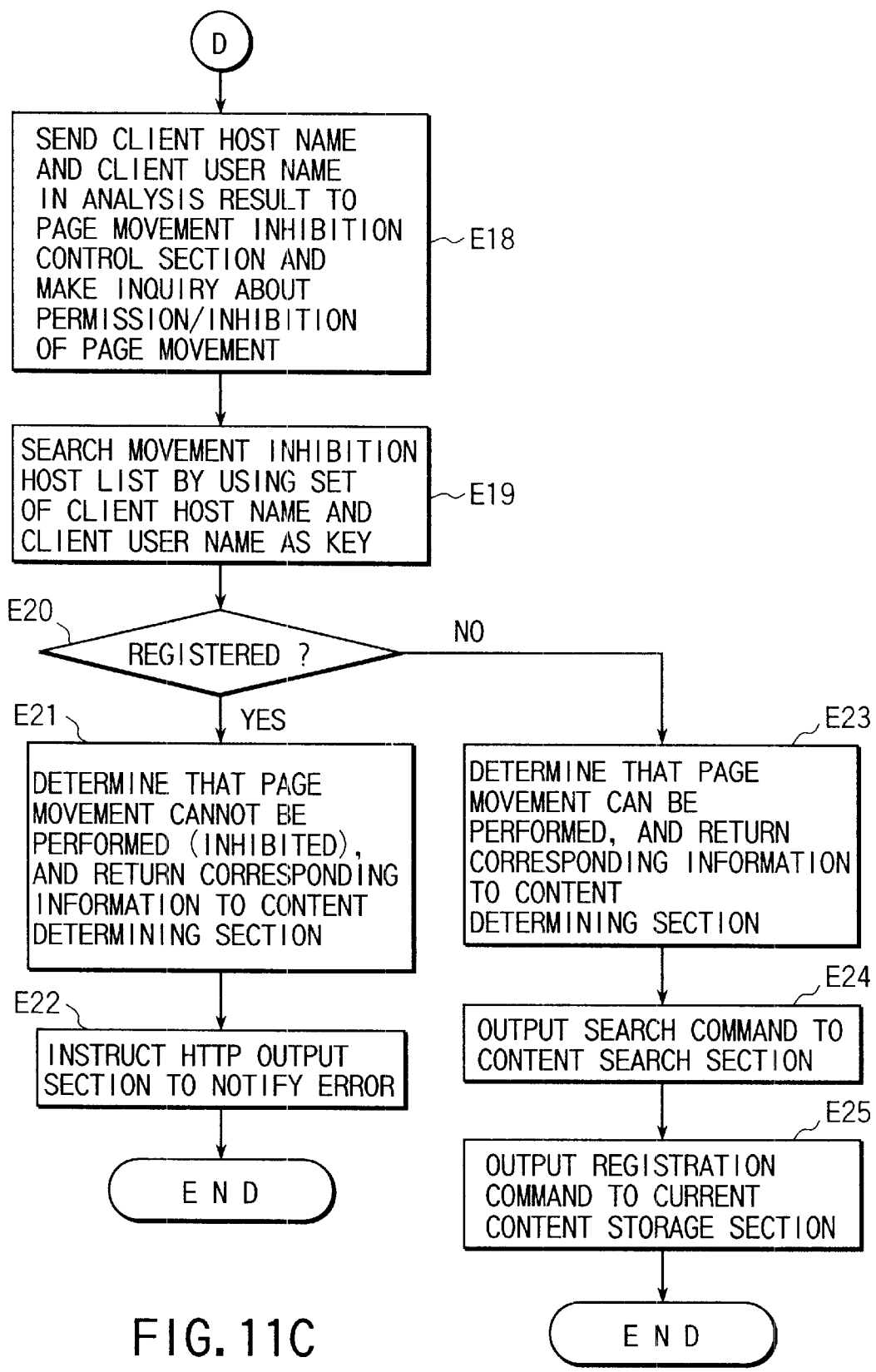

The operations of the content determining section 61 in the server 60 and the registration section 621 and inquiry section 622 in the page movement inhibition control section 62 in the arrangement shown in FIG. 9 will be described below with reference to the flow charts of FIGS. 11A to 11C.

First of all, a request character string from the client 20 is sent to an HTTP analyzing section 11 in the server 60. The HTTP analyzing section 11 analyzes the request character string and transfers the analysis result to the content determining section 61. This analysis result includes a set of "content name" indicating a request content, "client host name", and "client user name", and a method representing the request.

Upon reception of the analysis result (request content string) from the HTTP analyzing section 11 (step E1), the content determining section 61 checks whether the request represented by the analysis result is a predetermined specific request (step E2).

If the request is a specific request (YES in step E3), e.g., the request is a POST method as a request associated with resource operation or the like in the server 60, the request character string is transferred to the page movement inhibition control section 62 (step E4).

Upon reception of the request character string from the content determining section 61 (step E5), the registration section 621 in the page movement inhibition control section 62 checks whether the POST method command in the request character string is valid (step E6).

If it is determined that the POST method command is not valid (NO in step E7), the registration section 621 outputs a command to the HTTP output section 14 to notify an error (step E8).

If the POST method command is valid (YES in step E7), the registration section 621 extracts the character string of "control=" from the POST method character string (step E9), and checks whether the extracted value is "on" or "off" (step E10). If the value is "on" (YES in step E11), the registration section 621 checks whether the set of "client host name" and "client user name" in the request character string is registered in the movement inhibition host list 623 (step E12). If this set of information is not registered (NO in step E13), the registration section 621 registers the set of "client host name" and "client user name" in the movement inhibition host list 623 (step E14).

If the value of "control=" is "off" (NO in step E11), the registration section 621 checks whether the set of "client host name" and "client user name" in the request character string is registered in the movement inhibition host list 623 (step E16). If this set of information is registered (YES in step E16), the registration section 621 deletes the set of "client host name" and "client user name" from the movement inhibition host list 623 (step E17).

If a request other than the POST method request, e.g., an analysis result on a general content request, is sent from the HTTP analyzing section 11 (NO in step E3), the content determining section 61 sends the set of "client host name" and "client user name" in the analysis result to the page movement inhibition control section 62 to make an inquiry about permission/inhibition of page movement (step E18).

The inquiry section 622 in the page movement inhibition control section 62 searches the movement inhibition host list 623 with the set of "client host name" and "client user name" transferred from the content determining section 61 as a key (step E19).

If the set of "client host name" and "client user name" transferred from the content determining section 61 is registered in the movement inhibition host list 623 (YES in step E20), the inquiry section 622 determines that page movement cannot be moved (inhibited) on the client side, and returns a value representing the corresponding information to the content determining section 61 (step E21).

Upon reception of the value representing page movement inhibition from the page movement inhibition control section 62 (inquiry section 622), the content determining section 61 transmits an error notification to an HTTP output section 14 (step E22), and does not start a content search section 13. In this case, an error notification is returned to the client 20 as the request source. As a result, error display is performed. That is, no request content is sent to the client 20, and hence the client 20 cannot move (switch) the page.

If the set of "client host name" and "client user name" transferred from the content determining section 61 is not registered in the movement inhibition host list 623 (NO in step E20), the inquiry section 622 determines that page movement can be moved (permitted), and returns a value representing the corresponding information to the content determining section 61 (step E23).

Upon reception of the value representing page movement permission from the page movement inhibition control section 62 (inquiry section 622), the content determining section 61 transfers the content request analysis result (request character string) from the HTTP analyzing section 11 to the content search section 13 to give a request content search command thereto (step E24). At the same time, a content determining section 61 transfers the content request analysis result to a current content storage section 15 and makes it register the set of "content name" of the content to be transmitted, "client host name", and "client user name" in a current content storage list 153 (see FIG. 1) in the current content storage section 15 (step E25). In this case, the content search section 13 searches the request content. If the request content can be searched, the content is sent to the client 20 as the request source to be displayed in place of the currently displayed content. That is, the page is moved (switched).

In the cases shown in FIGS. 10A and 10B, when the input start button 141 is clicked on the page window in FIG. 10A displayed on the client 20 side, information from the client 20 is registered in the movement inhibition host list 623 by the page movement inhibition control section 62 in response to a specific request including "control=on" which is automatically issued by the server 60 at this time. Similarly, when the end button 142 on the page window in FIG. 10B is clicked, the information of the client 20 is deleted from the movement inhibition host list 623 by the page movement inhibition control section 62 in accordance with a specific request including "control=off" which is automatically issued to the server 60. Page moving operation on the client 20 is inhibited in the interval between the clicking of the input start button 141 and the clicking of the end button 142.

As described above, according to this embodiment, with the use of the new server 60 obtained by adding the content determining section 61 and page movement inhibition control section 62 to the server in FIG. 1, inhibition/permission of page moving operation (e.g., Back/Forward operation on the browser) on the client 20 (browser) side can be controlled.

Fifth Embodiment

Figure 12:
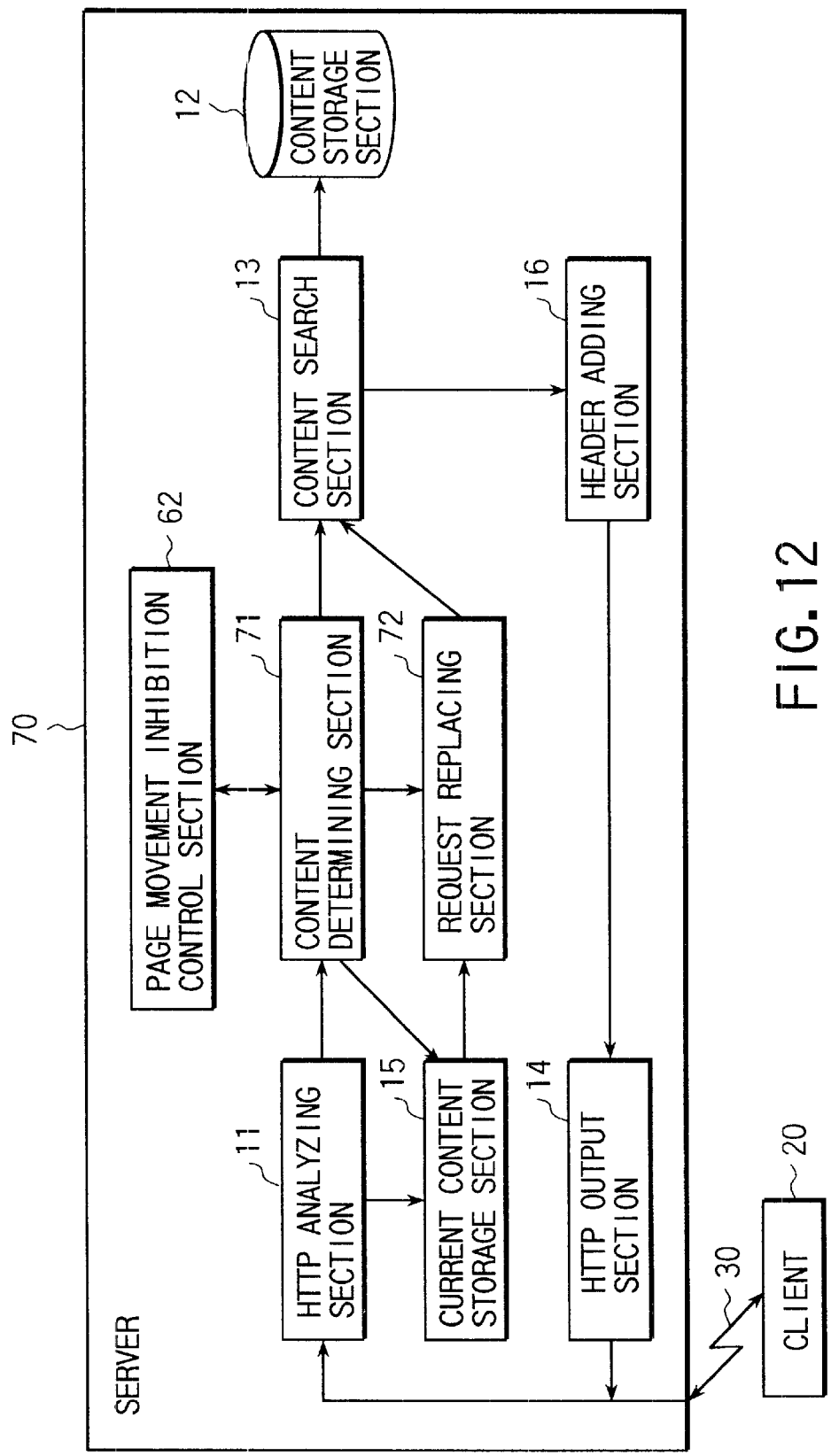
FIG. 12 is a block diagram showing the arrangement of a client server system having a Web server as a main component according to the fifth embodiment of the present invention.

FIG. 12 is a block diagram showing the arrangement of a client server system having a Web server as a main component according to the fifth embodiment of the present invention. Note that the same reference numerals in FIG. 12 denote the same parts as in FIG. 9, and a detailed description thereof will be omitted.

A server 70 in FIG. 12 differs from the server 60 in that a request replacing section 72 is added to the arrangement of the server 60, and a content determining section 71 is used in place of the content determining section 61.

More specifically, according to the server 60 in FIG. 9, when the page movement inhibition state is set with respect to a request from the client 20, an error notification is simply returned from the content determining section 61 to the HTTP output section 14. In contrast to this, according to the server 70 in FIG. 12, an error notification is sent from the content determining section 71 (corresponding to the content determining section 61 in FIG. 9) to the request replacing section 72. The request replacing section 72 receives the content information displayed on a client 20 as a request source immediately before the generation of the current request from a current content storage section 15, forcibly replaces the content request in the page movement inhibition state with the content request displayed immediately before the current request, and sends the resultant request to a content search section 13.

Figure 13:
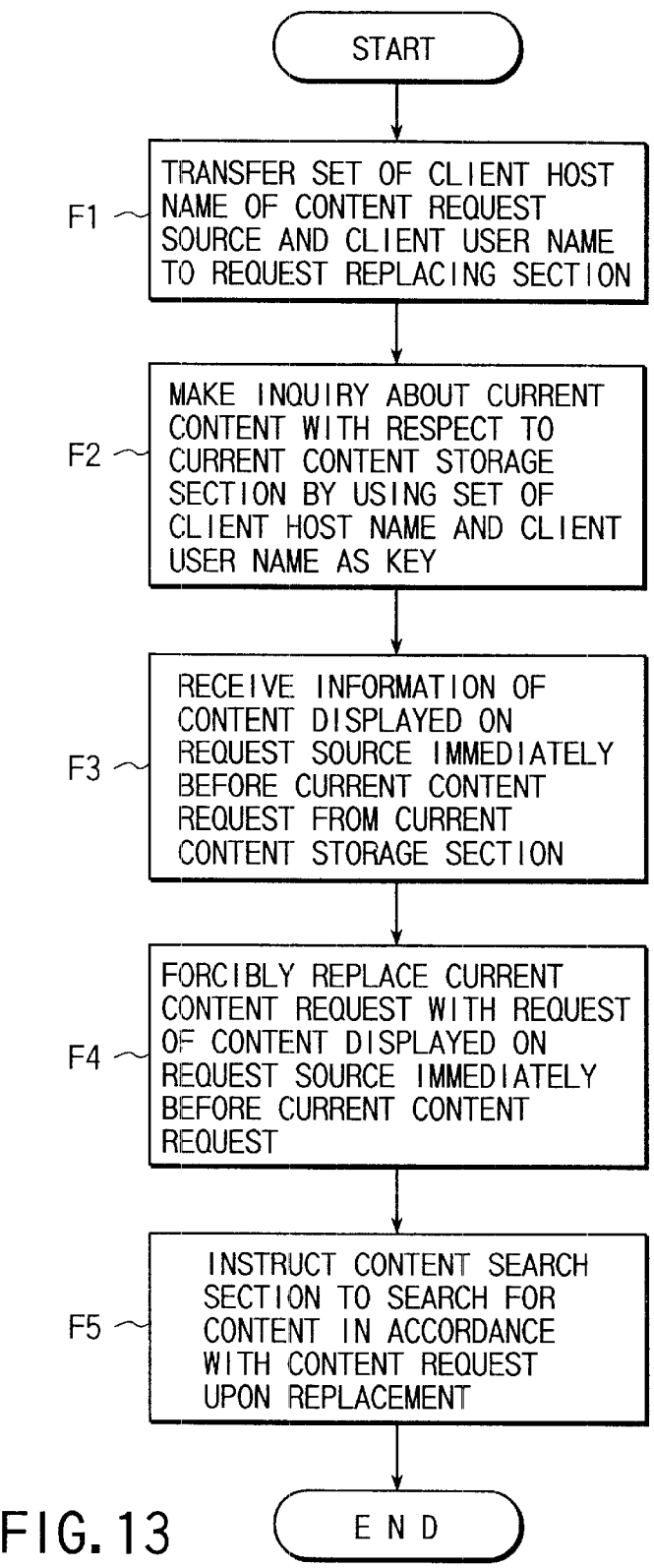
FIG. 13 is a flow chart for explaining the operations of a content determining section and request replacing section in the Web server in FIG. 12.

The operations of the content determining section 71 and request replacing section 72 in the server 70 having the arrangement shown in FIG. 12 will be described below mainly on the differences between the server 70 and the server 60 in FIG. 9, with reference to the flow chart of FIG. 13.

As in the fourth embodiment, assume that the content determining section 71 makes an inquiry about the permission/inhibition of page movement with respect to a page movement inhibition control section 62 in response to a content request from the client 20, and a value representing page moving inhibition is returned from the page movement inhibition control section 62.

Upon reception of the value representing page movement inhibition from the page movement inhibition control section 62, the content determining section 71 transfers a set of "client host name" of the content request source and "client user name" to the request replacing section 72 (step F1) to start the request replacing section 72.

The request replacing section 72 makes an inquiry about the current content with respect to the current content storage section 15 by using the set of "client host name" and "client user name" transferred from the content determining section 71 as a key (step F2). In this case, as in the first embodiment, an inquiry section 152 (see FIG. 1) in the current content storage section 15 searches a current content storage list 153 and returns a return value as a search result, i.e., the content information displayed immediately before the current content request to the request replacing section 72 as the inquiry source.

The request replacing section 72 forcibly replaces the current content request from the client 20 with the content request displayed on the client 20 immediately before the current content request returned from the current content storage section 15 (step F4), and instructs the content search section 13 to perform content search in accordance with the content request after the replacement (step F5).

With this operation, the content displayed on the client 20 as the request source immediately before the current content request is transmitted to the client 20 as the content request source instead of the request content.

As described above, according to this embodiment, when the browser of the client 20 performs page moving operation (e.g., Back/Forward operation on the browser) while the client 20 in the page movement inhibition state, the operation is neglected. In this case, unlike in the fourth embodiment, the server 70 can transmit the content displayed immediately before the page moving operation to the client 20 instead of performing error display.

The functional elements constituting the servers 10, 40, 50, 60, and 70 described above or the procedures executed by the servers 10, 40, 50, 60, and 70 can be implemented by loading a recording medium such as a CD-ROM, on which a program for making the computer function as a set of the functional elements or a program for making the computer execute the procedures is recorded, into the computer, and reading out and executing the program. This program may be loaded into the computer through a communication medium such as a communication line or the like.

As has been described in detail above, according to the present invention, since the page currently displayed or most lately displayed on the client side can be retained and managed in units of clients on the server side, the latest display page on each client can be known on the server side.

According to the present invention, by using a storage file type list, the type of content information (page) to be retained/managed on the server side can be designated.

According to the present invention, with a content transmission order list on the server side, content browsing on the client side can be performed in accordance with the content transmission order intended by the server.

In addition, according to the present invention, designation of permission/inhibition of page moving operation on the client side can be controlled by operation with respect to specific portions on the page window displayed on the client side.

Furthermore, according to the present invention, a content request from the client side in the page movement inhibition state can be forcibly replaced with the content displayed on the client side as the request source immediately before the content request, and the content displayed immediately before the request can be returned to the request source.

Moreover, according to the present invention, a content sent from the server to a client as a content request source can be inhibited from being cached into the client. With this operation, even if the Back or Forward button is operated on the browser on the client side, since a content request is always issued to the server, the server can know the content currently displayed on the client side.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of allowing a Web server which transmits a content to a client as a content request source in accordance with a content request from the client to retain and manage information related to a content currently displayed on the client, comprising the steps of:

preparing a current content storage list in which identification information of a latest content transmitted to the client as the content request source is registered in combination with client information indicating the client as the content request source;

searching the current content storage list in response to the content request from the client by using the client information indicating the client as the content request source as a key, registering a set of the client information and identification information of a content indicated by the content request in said current content storage list when the client information of the content request source is not registered, and replacing the content identification information combined with the client information in the current content storage list with the content identification information indicated by the corresponding content request when the client information of the content request source is registered; and searching the content requested by the content request and transmitting the content to the client as the content request source.

2. A method according to claim 1, further comprising:

preparing a storage file type list in which types of content information to be registered in the current content storage list are registered; and searching the storage file type list with a type of the content information indicated by the content request as a key, and performing registration in the current content storage list only when the type of the content information indicated by the content request is registered in the storage file type list.

3. A method according to claim 1, further comprising:

preparing a transmission order storage list in which an array indicating a content transmission order is registered;

searching the transmission order storage list by using the content identification information indicated by the content request as a key, searching the current content storage list by using the client information of the corresponding content request source as a key when the array including the content identification information is present, and extracting content identification information combined with the client information when the client information of the content request source is registered; and searching the array for content identification information to be transmitted next to the extracted content identification information, searching for a content indicated by the content identification information when the searched content identification information coincides with the content identification information indicated by the content request, and performing registration processing in the current content storage list and the transmission processing.

4. A method according to claim 1, further comprising:

preparing a movement inhibition host list in which client information as a page movement inhibition target;

setting, in a content transmitted from the Web server to the client as the content request source, a procedure for issuing a specific request from the client to the Web server to request page movement inhibition/permission when a predetermined portion of the content is operated while the content is displayed on the window;

when the client issues a request to the Web server, checking whether the request is the specific request;

when the request is the specific request, performing a first search to search the movement inhibition host list by using client information of the corresponding request source as a key;

registering the client information in the movement inhibition host list when a result of the first search indicates that the client information of the request source is not registered, and the specific request indicates page movement inhibition, and deleting the client information from the movement inhibition host list when the client information of the request source is not registered, and the specific request indicates page movement permission;

when the request is not the specific request, performing a second search to search the movement inhibition host list by using the client information of the request source as a key;

when a result of the second search indicates that the client information of the request source is registered, returning an error notification to the client as the request source; and when a result of the second search indicates that the client information of the request source is not registered, searching for a content indicated by the request, and performing registration processing in the current content storage list and the transmission processing.

5. A method according to claim 1 further comprising:

preparing a movement inhibition host list in which client information as a page movement inhibition target;

setting, in a content transmitted from the Web server to the client as the content request source, a procedure for issuing a specific request from the client to the Web server to request page movement inhibition/permission when a predetermined portion of the content is operated while the content is displayed on the window;

when the client issues a request to the Web server, checking whether the request is the specific request;

when the request is the specific request, performing a first search to search the movement inhibition host list by using client information of the corresponding request source as a key;

registering the client information in the movement inhibition host list when a result of the first search indicates that the client information of the request source is not registered, and the specific request indicates page movement inhibition, and deleting the client information from the movement inhibition host list when the client information of the request source is not registered, and the specific request indicates page movement permission;

when the request is not the specific request, performing a second search to search the movement inhibition host list by using the client information of the request source as a key;

when a result of the second search indicates that the client information of the request source is registered, searching the current content storage list by using the client information of the request source as a key to acquire content identification information combined with the client information, and transmitting a content indicated by the acquired content identification information to the client as the request source in place of the requested content; and when a result of the second search indicates that the client information of the request source is not registered, searching a content indicated by the request and performing registration processing in the current content storage list and the transmission processing.

6. A method according to claim 1, further comprising adding specific header information to a content to be transmitted to the request source, the information indicating that the content is not cached.

7. A Web server for transmitting a content to a client as a content request source in accordance with a corresponding content request from the client, comprising:

a current content storage list in which identification information of a latest content transmitted to the client as the content request source is registered in combination with client information indicating the client as the content request source;

registration means for searching the current content storage list in response to the content request from the client by using the client information indicating the client as the content request source as a key, registering a set of the client information and identification information of a content indicated by the content request in said current content storage list when the client information of the content request source is not registered, and replacing the content identification information combined with the client information in the current content storage list with the content identification information indicated by the corresponding content request when the client information of the content request source is registered; and means for searching the content requested by the content request and transmitting the content to the client as the content request source.

8. A server according to claim 7, further comprising a storage file type list in which types of content information to be registered in said current content storage list are registered.

9. A server according to claim 7, further comprising a transmission order storage list in which an array indicating a content transmission order is registered.

10. A server according to claim 7, further comprising a movement inhibition host list in which client information as a page movement inhibition target is registered.

11. A server according to claim 10, further comprising means for returning an error notification to the client as the request source when the client information of the request source is registered in said movement inhibition host list.

12. A server according to claim 10, further comprising means for, when the client information of the request source is registered in said movement inhibition host list, returning the same content as that currently displayed on the client as the request source to the client as the request source by searching the current content storage list.

13. A server according to claim 7, wherein specific header information indicting that a content is not cached is added to the content to be transmitted to the request source.

* * * * *